United States Patent
Sato et al.

(10) Patent No.: US 8,684,878 B2
(45) Date of Patent: Apr. 1, 2014

(54) SPEED REDUCER

(75) Inventors: Koji Sato, Iwata (JP); Koji Akiyoshi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/641,716

(22) PCT Filed: Apr. 13, 2011

(86) PCT No.: PCT/JP2011/059155
§ 371 (c)(1),
(2), (4) Date: Oct. 17, 2012

(87) PCT Pub. No.: WO2011/132580
PCT Pub. Date: Oct. 27, 2011

(65) Prior Publication Data
US 2013/0035191 A1 Feb. 7, 2013

(30) Foreign Application Priority Data

Apr. 21, 2010 (JP) ................. 2010-097774
Apr. 21, 2010 (JP) ................. 2010-097777
Jun. 23, 2010 (JP) ................. 2010-142774

(51) Int. Cl.
*F16H 1/32* (2006.01)

(52) U.S. Cl.
CPC ............ *F16H 1/32* (2013.01); *F16H 2001/323* (2013.01)
USPC ...................................................... 475/168

(58) Field of Classification Search
CPC combination set(s) only.
See application file for complete search history.

(56) References Cited

U.S. PATENT DOCUMENTS

| | | | | |
|---|---|---|---|---|
| 4,584,904 A | * | 4/1986 | Distin et al. | 475/168 |
| 4,604,916 A | * | 8/1986 | Distin, Jr. | 475/168 |

FOREIGN PATENT DOCUMENTS

| | | | |
|---|---|---|---|
| JP | 59-140937 | | 8/1984 |
| JP | 62-093565 | | 4/1987 |
| JP | 04-219558 | | 8/1992 |
| JP | 2010-038362 | | 2/2010 |
| JP | 2010-048233 | | 3/2010 |
| JP | 2010-071462 | | 4/2010 |
| JP | 2013068274 A | * | 4/2013 |
| WO | 2010/004880 | | 1/2010 |
| WO | 2010/018821 | | 2/2010 |

OTHER PUBLICATIONS

International Search Report issued May 24, 2011 in International (PCT) Application No. PCT/JP2011/059155.
Written Opinion of the International Searching Authority, issued May 24, 2011, with partial English translation.

* cited by examiner

*Primary Examiner* — Dirk Wright
(74) *Attorney, Agent, or Firm* — Wenderoth, Lind & Ponack, L.L.P.

(57) ABSTRACT

A speed reducer having rollers axially longer than its cage, includes coaxial input and output shafts with mutualy facing ends covered by a housing that supports an internal gear. An eccentric disk is mounted on an end of the input shaft to be located radially inwardly of, and rotatable relative to, the internal gear. A cage at the end of the output shaft is between the internal gear and a bearing fitted on the disk. The cage has pockets unequal in number to internal teeth of the internal gear. A roller in each pocket is rollable along the radially outer surface of the bearing outer race. The input shaft rotation is transmitted to the shaft at a reduced speed ratio determined by the number of the internal teeth. An annular recess is formed along the corner between the closed end and radially inner surfaces of the cage.

17 Claims, 13 Drawing Sheets

SPEED REDUCER

TECHNICAL FIELD

This invention relates to a roller type speed reducer including an internal gear having internal teeth on its radially inner surface, and rollers which are fewer in number than the internal teeth and adapted to be brought into engagement with the internal teeth one after another, thereby transmitting the rotation of an input shaft to an output shaft at a reduced speed.

BACKGROUND ART

Patent document 1 discloses a conventional roller type speed reducer of this type. FIGS. 21 and 22 show the roller type speed reducer disclosed in Patent document 1. This roller type speed reducer includes an input shaft 60 and an output shaft 61 arranged coaxial with each other with their ends facing each other. Their ends facing each other are covered by a housing 62. The housing 62 supports an internal gear 63 having internal teeth 63a with a curved profile on its radially inner surface. Axially spaced apart eccentric disks 64 are mounted on the end portion of the input shaft 60 so as to be located radially inwardly of, and rotatable relative to, the internal gear 63. The output shaft 61 has a cage 66 at its end disposed between the internal gear 63 and bearings 65 press-fitted on the radially outer surfaces of the respective eccentric disks 64. The cage 66 is formed with two rows of pockets 67, each row of pockets being circumferentially equidistantly spaced apart from each other and radially facing one of the eccentric disks 64. The pockets of each row are fewer in number than the internal teeth 63a. A roller is 68 is received in each pocket 67 so as to be rollable along the radially outer surface of one of the bearings 65.

In operation of this speed reducer, when the input shaft 60 rotates, the eccentric disks 64 rotate together with the input shaft 69. This causes each roller 68 to engage the internal teeth 63a of the internal gear 63 one after another. In particular, when the input shaft 60 rotates once, each roller 68 moves circumferentially by a distance equal to the circumferential dimension of one internal tooth 63a. This results in the rotation of the output shaft 61 at a reduced speed relative to the input shaft 60.

For smooth rotation, the internal teeth 63a have to be shaped such that all of the rollers 68 are always in contact with internal teeth 63a. Specifically, each tooth 63a has a profile equal to the curve at the outside of one roller 68 parallel to the locus of the roller 68 when the output shaft 61 is rotated by an angle corresponding to one pitch of the internal gear 63 by the eccentric disks 64.

PRIOR ART DOCUMENTS

Patent Documents

Patent document 1: JP Patent Publication 62-93565A

SUMMARY OF THE INVENTION

Object of the Invention

If the surface pressure is high at the contact portions between the rollers 68 and the internal teeth 63a or between the rollers 68 and the radially outer surfaces of the outer races 65a of the bearings 65, these portions are likely to be damaged, which leads to a shorter lifespan of the speed reducer. Therefore, for a longer lifespan of the speed reducer, it is necessary to reduce the surface pressure of the above-mentioned contact portions.

One effective way to reduce the surface pressure of the above-mentioned contact portions is to increase the axial length of the rollers 68.

In order to increase the axial length of the rollers 68, it is necessary to correspondingly increase the axial length of the pockets 67 too. The pockets 67 are formed by punching, such as forging or pressing. When forming the pockets by punching, in order to ensure strength of a die used for punching the pockets, it is necessary, as shown in FIG. 22, to provide a cylindrical portion 70 extending from the deeper end surfaces 67a of deeper pockets 67 toward a closed end surface 66a of the cage 66 and having a predetermined axial dimension or over. The letter a shows the axial dimension of the cylindrical portion 70.

As shown in FIG. 22, the cage 66 of this conventional speed reducer has an arcuate surface 71 extending along the corner between the radially inner surface and the closed end surface 66a, of the cage and having a radius of curvature $r_4$. In order to ensure a sufficient cylindrical portion 70, the radius of curvature $r_4$ of the arcuate surface 71 has to be as small as possible.

But the smaller the radius of curvature $r_4$ of the arcuate surface 71, the more difficult it becomes to punch the pockets 67. Thus, it is impossible to reduce the radius of curvature $r_4$ beyond a certain extent. If the radius of curvature r4 is large, the outer race 65a of the bearing 65 tends to interfere, at the radially outer portion of its side surface, with the arcuate surface 71. To prevent this, it is necessary to provide a gap 72 of a certain size between the side surface of the outer race 65a and the closed end surface 66a of the cage 66. But such a gap reduces the axial length of the pockets 67 and thus the axial length of the rollers 68 if the axial length of the cage 66 is unchanged. The letter b in FIG. 22 indicates the axial length of the gap 72.

In conventional roller type speed reducers, as shown in FIG. 23, each pocket 67, in which a roller 68 is received, has arcuate surfaces 67c at the four corners thereof to reduce stress concentration. If the arcuate surfaces 67c have a radius of curvature $r_5$ larger than the radius of curvature $r_1$ of arcuate chamfers 68c formed along the corners between the rolling surface 68a and the respective end surfaces 68b, of each roller 68, the chamfers 68c will interfere with the arcuate surfaces 67c at the four corners of each pocket. Thus, the arcuate surfaces 67c have a radius of curvature $r_5$ smaller than the radius of curvature r1 of the chamfers 68c of the rollers 68. This makes it impossible to form arcuate surfaces 67c having a radius of curvature large enough to reduce stress concentration. The conventional cages 66 are thus not durable enough.

In conventional roller type speed reducers, the eccentric disks 64, shown in FIG. 21, are integral with the input shaft 60, and the bearings 65 are press-fitted onto the radially outer surfaces, as the press-fitting surfaces 64a, of the respective eccentric disks 64. Thus, it is necessary to machine the press-fitting surfaces 64a on the eccentric disks, which are integral with the input shaft 60. Since the press-fitting surfaces 64a are eccentric relative to the input shaft 60, it is difficult, and thus costly, to form the press-fitting surfaces by grinding.

If there are axially separated two eccentric disks 64 as shown in FIG. 21, grinding of the press-fitting surfaces are particularly difficult and thus costly.

A first object of the present invention is to increase the length of the rollers without increasing the axial length of the cage, thereby increasing the lifespan of the cage.

A second object of the present invention is to reduce the machining cost of a roller type speed reducer.

In order to achieve the first object, the first invention provides a speed reducer comprising a stationary housing, an internal gear supported by the housing and having a plurality of internal teeth on an inner periphery of the internal gear, an input shaft including an eccentric disk provided at one end portion of the input shaft and rotatable in the internal gear, an output shaft coaxial with the input shaft, a cage provided at an end portion of the output shaft facing the input shaft and rotatably disposed between the internal gear and the eccentric disk, the cage being formed with circumferentially equidistantly spaced apart pockets which are not equal in number to the internal teeth of the internal gear at a portion of the cage that is radially aligned with the eccentric disk, rollers received in the respective pockets and configured to mesh with the respective rollers one after another when the eccentric disk rotates such that when the input shaft rotates once, each roller moves in a circumferential direction by a distance equal to a circumferential dimension of one of the internal teeth, whereby the output shaft is rotated at a reduced speed, wherein the cage is formed with an annular recess at a corner between a radially inner surface of the cage and a closed end surface of the cage.

By forming, as described above, the annular recess at the corner between the radially inner surface and the closed end surface, of the cage, it is possible to form a cylindrical portion which extends from the deep end surfaces of the pockets toward the closed end surface of the cage and which is wide enough to ensure strength of die for punching the pockets. This makes it possible to increase the axial length of the pockets without increasing the axial length of the cage, which in turn allows increasing the axial length of the rollers. This reduces surface contact pressure between the rollers and the pockets, thus increasing the lifespan of the speed reducer.

The annular recess may be formed by cutting, but is preferably formed by forging because forging is easier, and thus less costly, than cutting.

If the internal gear is fixed in position by press-fitting the internal gear into the housing, and if the thus press-fitted internal gear is not coaxial with the housing, one or some of the internal teeth of the internal gear may be strongly pressed against the corresponding roller or rollers, increasing the surface pressure at the contact portion or portions. This reduces the lifespan of the speed reducer, and/or causes irregular rotation.

To avoid this problem, the internal gear is preferably supported on a radially inner surface of the housing so as to be alignable. Means for supporting the internal gear so as to be alignable may comprise spline engagement with which the internal gear is fitted in the radially inner surface of the housing, and an elastic member provided between engaging surfaces of the spline engagement. The elastic member is adapted to be elastically deformed to absorb misalignment between the housing and the internal gear. Alternatively, means for supporting the internal gear so as to be alignable may comprise a plurality of bolt inserting holes extending through the internal gear from one to another end surfaces of the internal gear, bolts inserted through the respective bolt inserting holes and threaded into respective threaded holes formed in an end surface of the housing, thereby supporting the internal gear, and elastic members disposed between the respective bolts and bolt inserting holes. The elastic members are adapted to be elastically deformed to absorb misalignment between the housing and the internal gear.

In the speed reducer according to the first invention, the internal teeth have preferably a surface roughness of Ra 1.6 or less to reduce wear of the internal teeth.

In the speed reducer according to the first embodiment, each pocket has a first end surface and a second end surface opposite to the first end surface in an axial direction of the cage and located closer to the closed end surface of the cage, at least the second end surface is a curved end surface having a radius of curvature larger than a radius of curvature of arcuate chamfers formed at the corners between a rolling surface and respective end surfaces, of each roller, the curved end surface being smoothly connected to side surfaces of the pocket which are opposed to each other in a circumferential direction of the cage, and the speed reducer further comprises restricting means for restricting movement of the rollers toward the curved end surfaces of the respective pockets.

If there are pockets arranged in axially spaced apart two rows, with the pockets in each row being circumferentially equidistantly spaced from each other, each of the pockets in the row located closer to the closed end of the cage has axially opposed end surfaces which are both in the form of curved surfaces, while each of the pockets in the row located closer to the open end of the cage has axially opposed end surfaces of which at least the one located closer to the closed end of the cage is a curved surface.

In the speed reducer according to the first invention, the restricting means for restricting movement of the rollers toward the curved end surfaces of the respective pockets may be any one of the following restricting means (a) to (c).

(a) Restricting means comprising a small-diameter cylindrical surface on a radially outer surface of the cage near the closed end surface of the cage, and a fixing ring press-fitted on the small-diameter cylindrical surface and having a leading end with respect to the direction in which the fixing ring is press-fitted onto the small-diameter cylindrical surface, the leading end being configured to restrict movement of the rollers toward the respective curved end surfaces.

(b) Restricting means comprising stopper members received in the curved end surfaces of the respective pockets and configured to restrict movement of the rollers toward the respective curved end surfaces.

(c) Restricting means comprising a small-diameter cylindrical surface on a radially outer surface of the cage near the closed end surface of the cage, and a metal strip wrapped around the small-diameter cylindrical surface and including bent pieces formed on one side surface of the metal strip and inserted in the respective pockets, the bent pieces being configured to restrict movement of the rollers toward the respective curved end surfaces.

If the restricting means (a) above is used, the small-diameter cylindrical surface preferably extends axially and terminates at a shoulder which is located at boundaries between side surfaces that are opposed to each other in the circumferential direction of the cage and the curved end surface, of each of the pockets. With this arrangement, the fixing ring can be easily mounted in position because the shoulder determines the press-fitted position of the fixing ring.

If the restricting means (b) above is used, each of the stopper members may be any one of a bent metal strip, an article made of a synthetic resin, and an article made of rubber.

In order to achieve the second object, the second invention provides, in the speed reducer according to the first invention, wherein the eccentric disk has a hole through which the input shaft is inserted and whose center is offset from the center of the radially outer surface of the eccentric disk, which is cylindrical in shape, and wherein the eccentric disk is a separate member from the input shaft and fitted on the input shaft while being rotationally fixed to the input shaft.

The eccentric disk may be rotationally fixed to the input shaft either by press-fitting the eccentric disk on the input shaft, or by fitting the eccentric disk on the input shaft through splines or serrations.

In the speed reducer according to the second invention, the eccentric disk is preferably formed by forming an eccentric disk material by forging or pressing, and finishing a radially outer surface of the eccentric disk material by grinding. With this arrangement, the eccentric disk can be formed more easily, and thus less costly, than when the eccentric disk is formed by turning.

Advantages of the Invention

In the first invention, the annular recess formed at the corner between the radially inner surface and the closed end surface, of the cage allows increasing the axial length of the pockets without increasing the axial length of the cage. This in turn makes it possible to increase the length of the rollers, thus reducing surface pressures at the contact portions between the rollers and the pockets, which increases the lifespan of the speed reducer.

Since at least the end surface of each pocket located closer to the closed end of the cage is a curved surface whose ends are smoothly connected to the respective side surfaces of the pockets that are opposed to each other in the circumferential direction of the cage, it is possible to prevent stress concentration on the boundary between the sides and the curved end surface, of each pocket while torque is being transmitted from the input shaft to the output shaft in a reduced speed ratio. This improves durability of the cage.

According to the second invention, since the eccentric disk is a separate member from the input shaft, the radially outer surface of the eccentric disk can be easily, and thus less costly, finished by e.g. centerless grinding.

BEST MODE FOR EMBODYING THE INVENTION

Figure 1:
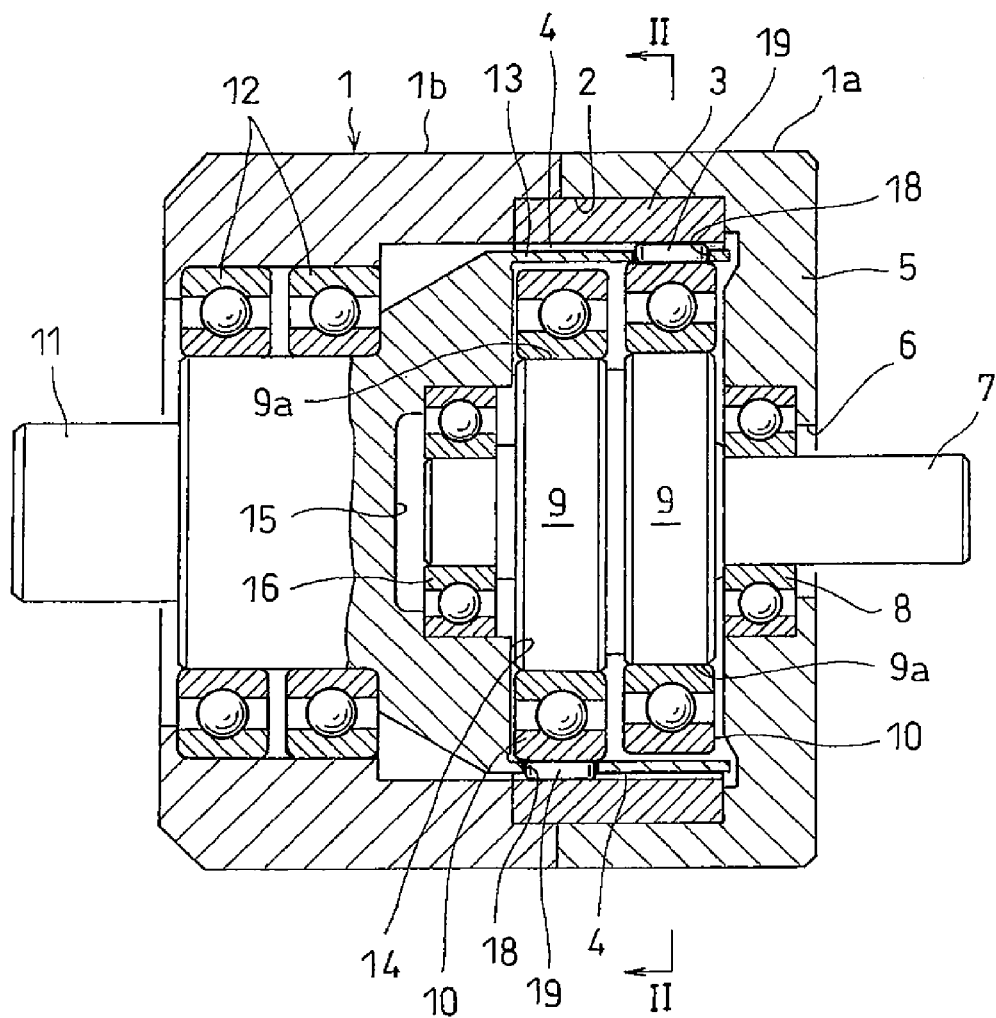
FIG. 1 is a vertical sectional front view of a speed reducer according to a first embodiment of the present invention.
Figure 2:
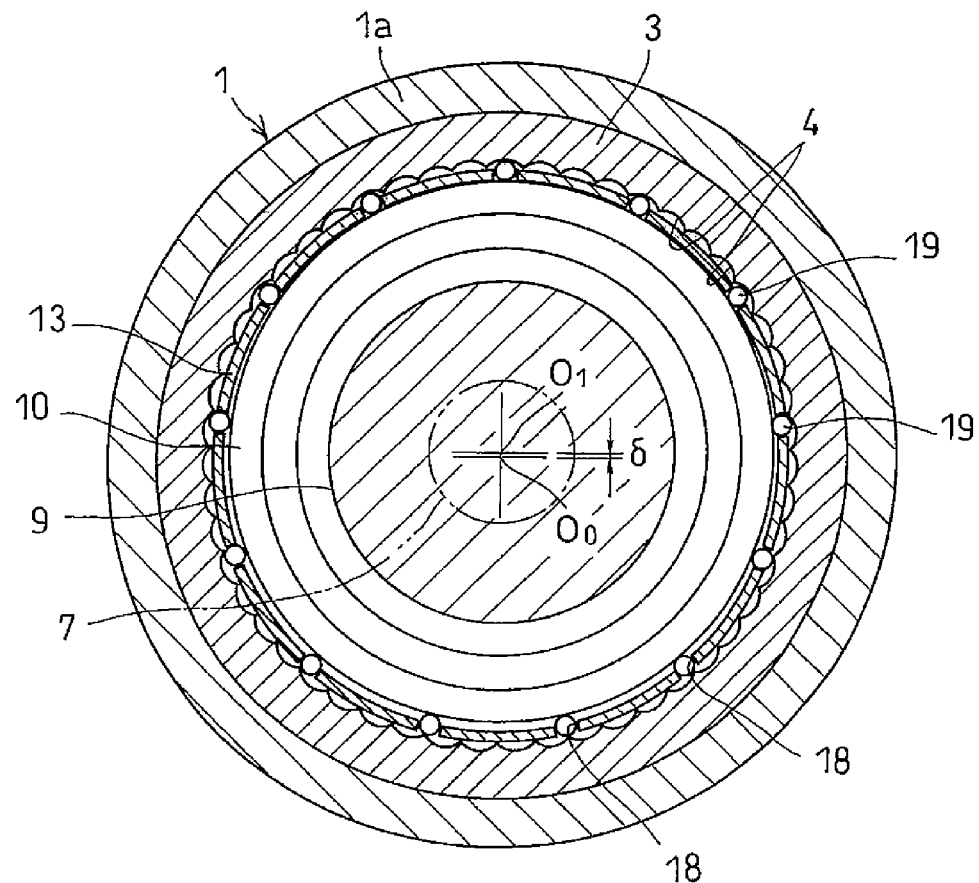
FIG. 2 is a sectional view taken along line II-II of FIG. 1.
Figure 3:
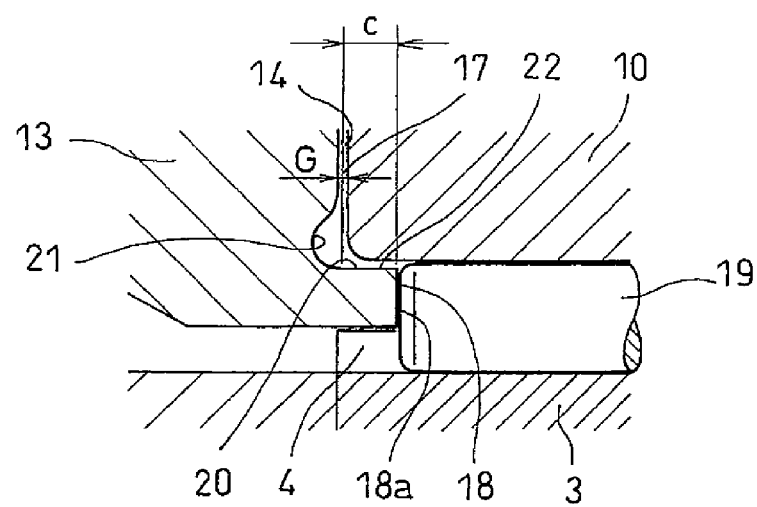
FIG. 3 is an enlarged sectional view of FIG. 1, showing a portion of a cage where a recess is formed.

The embodiments of the present invention are now described with reference to the drawings. FIGS. 1 to 3 show the speed reducer according to the first embodiment of the invention. As shown, the speed reducer of this embodiment includes a cylindrical housing 1 comprising first and second axially split housing portions 1a and 1b.

The first and second split housing portions 1a and 1b are joined together by tightening bolts, now shown. A large-diameter recess 2 is formed in radially inner surfaces of the first and second split housing portions 1a and 1b to extend across the abutting ends of the first and second split housing portions 1a and 1b.

An internal gear 3 is press-fitted in the large-diameter recess 2. The internal gear 3 has a plurality of internal teeth 4 on its radially inner surface.

The first split housing portion 1a has an end plate 5 at its open end. The end plate 5 has a shaft inserting hole 6 at its center in which an input shaft 7 is inserted. The input shaft 7 is rotatably supported on the end plate 5 through a bearing 8 mounted in the shaft inserting hole 6 so as to be coaxial with the internal gear 3. Two axially spaced apart eccentric disks 9 are mounted on the input shaft 7 at its end portion located in the housing 1b. The eccentric disks 9 are located radially inwardly of, and rotatable relative to, the internal gear 3.

The eccentric disks 9 have radially outer surfaces 9a, respectively, whose centers $O_1$ are offset from the axis $O_0$ of the input shaft 7 by a distance 6 (see FIG. 2) and located diametrically opposite to each other. Bearings 10 are mounted on the radially outer surfaces 9a of the respective eccentric disks 9. Bearings 10 are mounted on the radially outer surfaces 9a of the eccentric disks 9, respectively.

An output shaft 11 is inserted in the second split housing portion 1b, and is rotatably supported by bearings 12 mounted in the second split housing portion 1b near its open end so as to be coaxial with the input shaft 7.

The output shaft 11 has a cage 13 at its end facing the input shaft 7. The cage 13 is disposed between the bearings 10, which are mounted around the respective eccentric disks 9, and the internal gear 3. The cage 13 has a closed end defining a closed end surface 14 formed with a small-diameter hole 15 at its center. A bearing 16 is mounted in the small-diameter hole 15 for supporting the end of the input shaft 7. With the end of the input shaft 7 supported by the bearing 16, a minute gap 17 forms between the closed end surface 14 and one side of one of the bearings 10 facing the closed end surface 14. The letter G in FIG. 3 shows the size of the gap 17.

The cage 13 has two rows of pockets 18, each row of pockets being circumferentially equidistantly spaced from each other so as to radially face one of the bearings 10, which are mounted on the respective eccentric disks 9. The pockets of one of the two rows are circumferentially offset from the respective pockets of the other row by half the pitch.

The number of the pockets 18 of each row is not equal to the number of the internal teeth 4 of the internal gear 3. In the embodiment, the pockets 18 of each row are fewer in number than the internal teeth 4. But instead, the pockets 18 of each row may be larger in number than the internal teeth 4.

A roller 19 is received in each pocket 18 so as to be movable in the radial direction.

The rollers 19 are engageable with the respective internal teeth 4 of the internal gear 3. As disclosed in Patent document 1 mentioned above, the curve at the outside of one roller 19 parallel to the locus of the center of the roller 19 when the output shaft 11 rotates by an angle corresponding to one pitch of the internal teeth 4 of the internal gear 3 is equal to the shape of each internal tooth 4.

As shown in FIG. 3, the cage 13 is formed with an annular recess 21 at the corner between the radially inner surface 20 and the closed end surface 14. The recess 21 is formed by forging in the embodiment. But it may be formed by cutting.

In operation of the speed reducer of the first embodiment, when the input shaft 7 rotates, the eccentric disks 9 rotate together with the input shaft 7. This causes each roller 19 to engage the internal teeth 4 of the internal gear 3 one after another. In particular, when the input shaft 7 rotates once, each roller 19 moves circumferentially by a distance equal to the circumferential dimension of one internal tooth 4. This results in the rotation of the output shaft 11 at a reduced speed relative to the input shaft 7.

The annular recess 21, which is formed at the corner between the closed end surface 14 and the radially inner surface 20, of the cage 13, serves to increase the axial length of a cylindrical portion 22 of the cage 13 extending from the deeper end surfaces 18a of the pockets 18 located nearer to the closed end surface 14 of the cage 13 to the closed end surface 14 of the cage 13. The axially long cylindrical portion 22 ensures strength of the die used to punch the pockets.

The annular recess 21 also increases the axial length of the pockets, and thus increases the axial length of the rollers 19, without the need to increase the axial length of the cage 13. Use of axially longer rollers 18 results in reduced surface pressure at the contact portions of the rollers 18, which in turn results in increased lifespan of the speed reducer. Reference numeral "c" in FIG. 3 indicates the axial length of the cylindrical portion 22.

In the first embodiment, in which the internal gear 3 is press-fitted in the housing 1, if the coaxiality between the housing 1 and the internal gear 3 breaks, the rollers 19 could be pressed against a portion of the inner periphery of the internal gear 3 at an excessive surface pressure. This could reduce the lifespan of the speed reducer, or cause irregular rotation.

Figure 4:
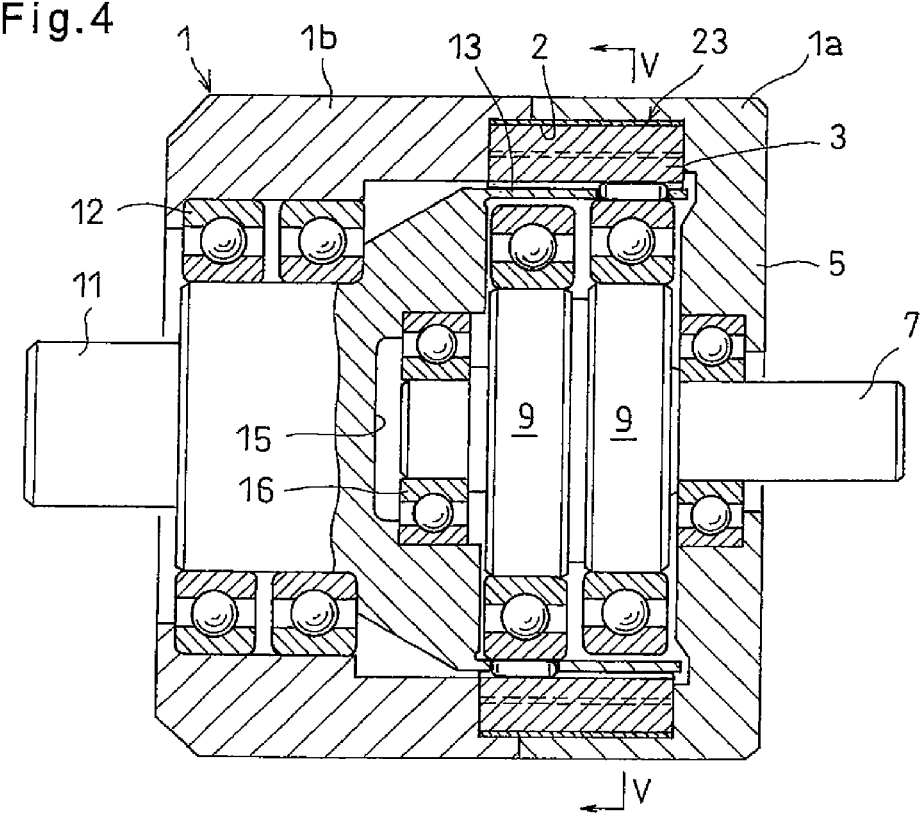
FIG. 4 is a vertical sectional front view of a speed reducer according to a second embodiment of the invention.
Figure 5:
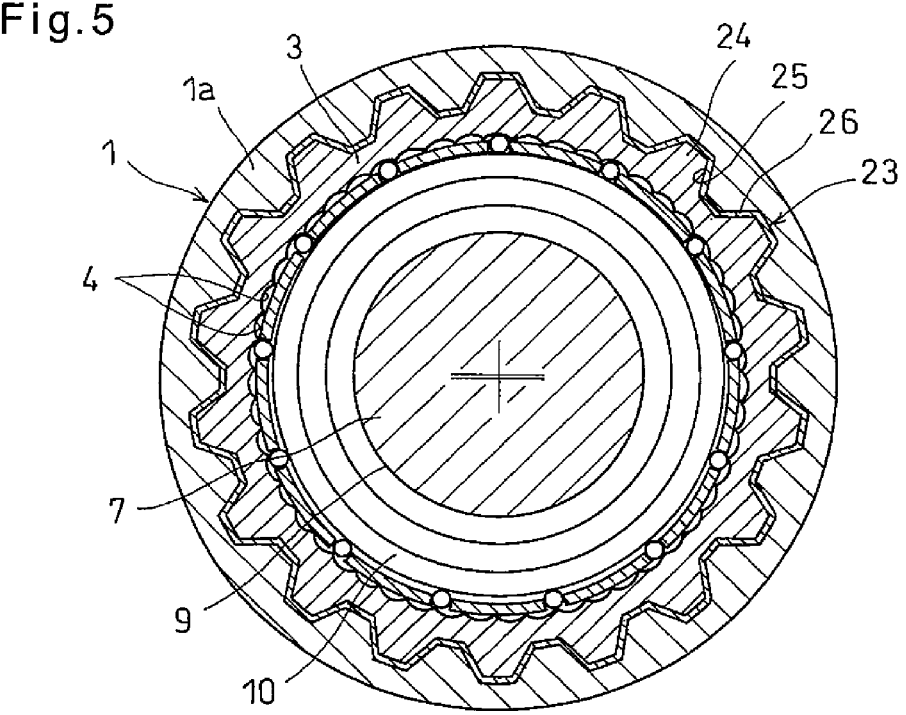
FIG. 5 is a sectional view taken along line V-V of FIG. 4.

To solve this problem, in the second embodiment, shown in FIGS. 4 and 5, the internal gear 3 is fitted in the large-diameter recess 2 formed in the housing 1 by means of spline engagement 23 comprising axial grooves 25 formed in the radially inner surface of the large-diameter recess 2 and axial teeth 24 formed on the radially outer surface of the internal gear 3 and engaged in the respective axial grooves 25, with an elastic member 26 disposed between the engaging surfaces of the spline engagement 23, so that the internal gear 3 can be centered relative to the housing 1.

By using the spline engagement 23 between the large-diameter recess 2 and the internal gear 3 with the elastic member 26 disposed between the engaging surfaces of the spline engagement 23, any misalignment between the housing 1 and the internal gear 3 is absorbed by elastic deformation of the elastic member 26. This prevents damage to a particular internal tooth or teeth 4, and also prevents irregular rotation.

Figure 6:
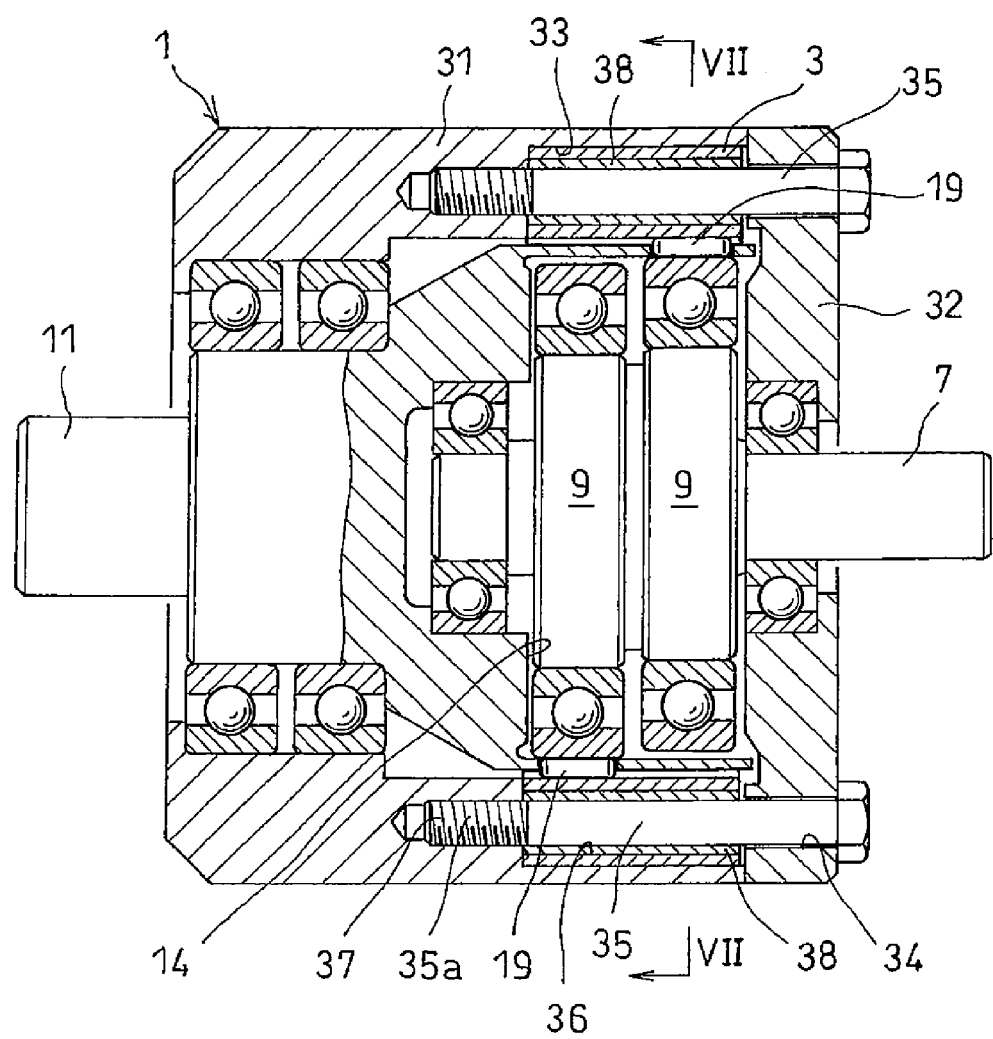
FIG. 6 is a vertical sectional front view of a speed reducer according to a third embodiment of the invention.
Figure 7:
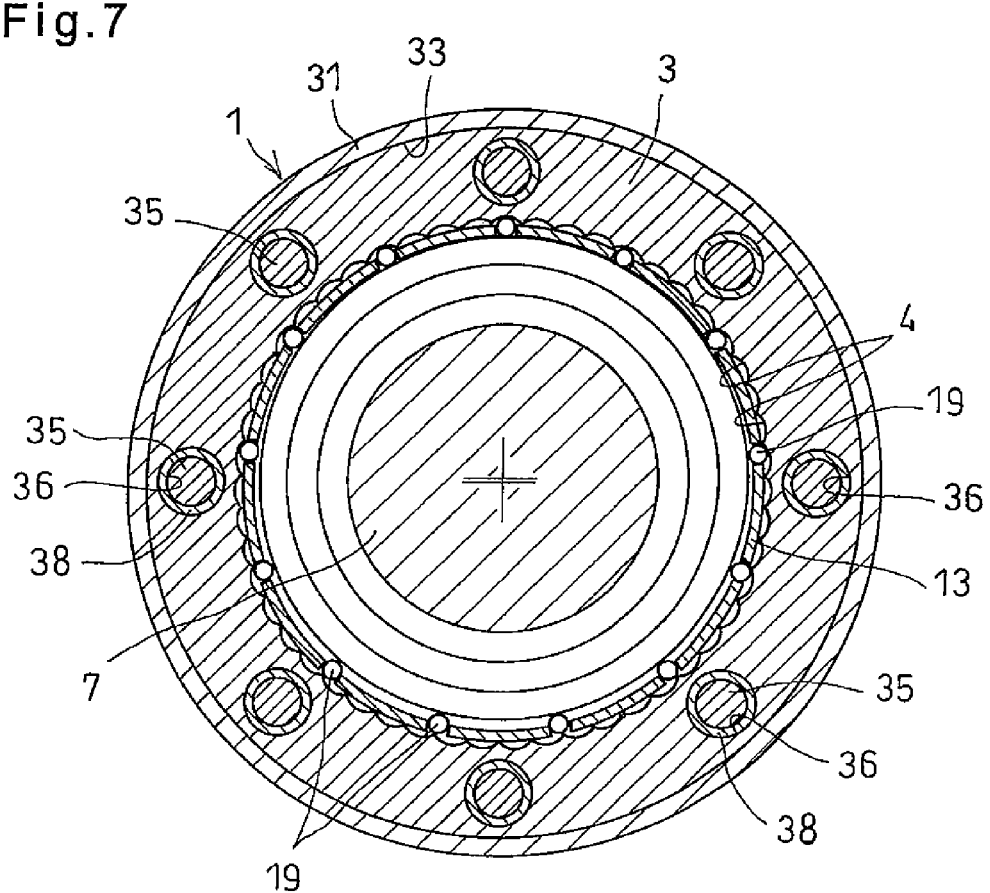
FIG. 7 is a sectional view taken along line VII-VII of FIG. 6.

For the same purpose, i.e. in order to prevent damage to a particular internal tooth or teeth 3 and to prevent irregular rotation, in the third embodiment, shown in FIGS. 6 and 7, the housing 1 comprises a housing body 31 formed with a large-diameter recess 33 at its end portion, and a separate end plate 32, and the internal gear 3 is mounted in this large-diameter recess 33.

The end plate 32 is formed with a plurality of circumferentially spaced apart axial holes 34 at its radially outer portion. Bolts 35 are inserted through the respective axial holes 34 and respective axial bolt inserting holes 36 formed in the internal gear 3, with a small-diameter threaded shaft portion 35a of each bolt 35 in threaded engagement with one of threaded holes 37 formed in the closed end surface of the large-diameter recess 33. By tightening the bolts 35, the internal gear 3 is supported in position. Elastic members 38 are disposed between the respective bolts 35 and bolt inserting holes 36.

By mounting the elastic members 38 between the respective bolts 35 and bolt inserting holes 36, in the same manner as in the second embodiment, any misalignment between the housing 1 and the internal gear 3 is absorbed by elastic deformation of the elastic members 38, thus preventing damage to a particular internal tooth or teeth 3, and also preventing irregular rotation.

In any of the first to third embodiments, while the rotation of the input shaft 7 is being transmitted to the output shaft 11 at a reduced speed, each roller 19 moves from one internal tooth 4 to another while kept in contact with the surfaces of the respective internal teeth 4. Thus, if the surface roughness of the internal teeth 4 is high, the internal teeth 4 tend to become worn.

Figure 8:
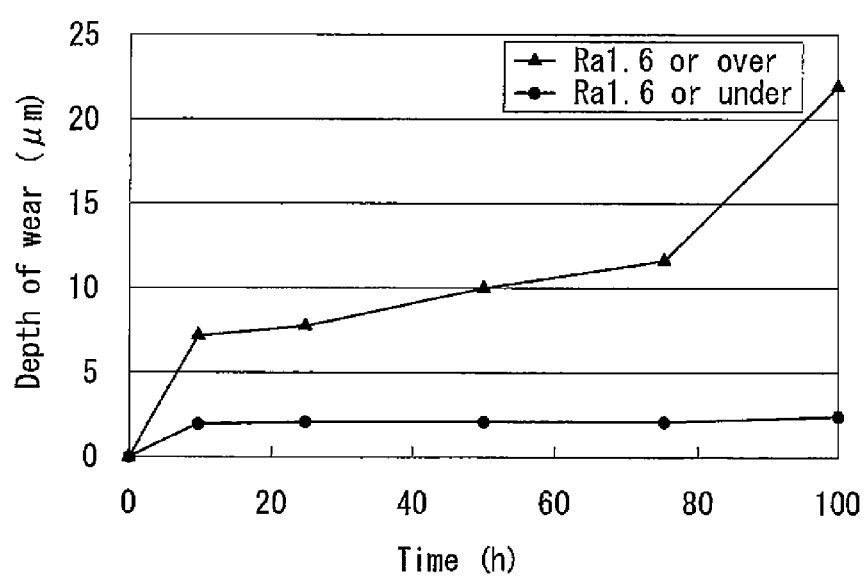
FIG. 8 is a graph showing the results of a wear endurance test.

Two internal gears 3, one having internal teeth 4 of which the surface roughness is Ra 1.6 or less, and the other having internal teeth 4 of which the surface roughness is higher than Ra 1.6, were prepared and subjected to a wear endurance test. FIG. 8 shows the results of the test.

The test results show that if the surface roughness of the internal teeth 4 is Ra 1.6 or less, the depth of wear of the internal teeth 4 is significantly smaller. Based on the test results, the internal teeth 4 of the respective embodiments have a surface roughness of Ra 1.6 or less to improve wear resistance.

In the embodiments, the input shaft 7 carries the two eccentric disks 9. But the number of the eccentric disks 9 is not limited to two. For example, the input shaft may carry only one eccentric disk 9.

Figure 23:
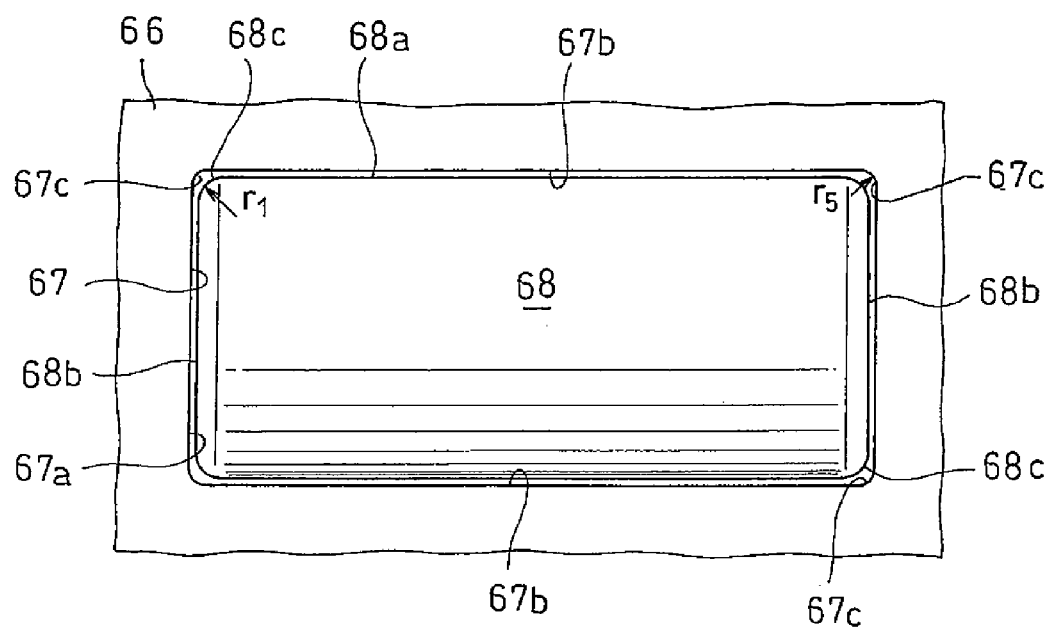
FIG. 23 is a plan view of a conventional pocket.

In the first embodiment, shown in FIGS. 1 to 3, while torque is being transmitted from the input shaft 7 to the output shaft 11, each roller 19 is pressed against one of the circumferentially opposed side surfaces of the pocket 18. In this state, if the radii of curvature $r_5$ of arcuate surfaces 67c formed at the corners between the respective circumferentially opposed side surfaces 67b and the end surfaces 67a, of each pocket 67, are small as shown in FIG. 23, stress may concentrate on the arcuate surfaces 67a, thus causing cracks starting from the corners of the pockets.

In the arrangement in which circumferentially equidistantly spaced apart pockets are formed in the cage in two axially spaced apart rows, as shown in FIG. 1, stress analysis by the finite element method (FEM) showed that stresses concentrated on the four corners of each of the pockets in the row located closer to the closed end of the cage 13 were higher than stresses concentrated on the four corner of each pocket in the row located closer to the open end of the cage 13.

Of the stresses concentrated on the four corners of each pocket 18 in the row located closer to the open end of the cage 13, the stresses concentrated on the two corners closer to the closed end of the cage 13 were higher than the stresses concentrated on the corners closer to the closed end of the cage 13. Thus, by reducing the stresses concentrated on the four corners of each pocket 18 in the row closer to the closed end of the cage 13, and the stresses concentrated on the above-mentioned two corners, i.e. the corners located closer to the closed end of the cage 13, of each pocket 18 in the row located closer to the open end of the cage 13, it is possible to markedly improve the durability of the cage 13.

Thus, in the fourth embodiment, shown in FIGS. 9 to 12, for improved durability of the cage 13, each pocket 18 in the row located closer to the closed end of the cage 13 has end surfaces 18$b$ which are curved surfaces having a larger radius of curvature than arcuate chamfers 19$c$ formed at the corners between the rolling surface 19$a$ and the respective end surfaces 19$b$, of each roller 19, and opposed to each other in the axial direction of the cage 13.

Each pocket 18 in the row located closer to the open end of the cage 13 has a curved end surface 18$b$ located closer to the closed end of the cage 13 and having a larger radius of curvature than the chamfers 19$c$ of the rollers 19, and a flat end surface 19$b$ located closer to the open end of the cage 13. Arcuate surfaces 18$c$ are formed at the corners between the flat end surface 18$b$ and the respective side surfaces 18$a$, of each pocket, which have a radius of curvature $r_2$ smaller than the radius of curvature $r_1$ of the arcuate chamfers 19$c$ of the rollers 19 (see FIG. 11).

The curved end surfaces 18$b$ have a radius of curvature $r_3$ which is half the width D, i.e. the dimension in the circumferential direction of the cage, of the pockets 18. In the embodiment, the curved end surfaces 18$b$ are semicircles whose diameter is equal to the width D of the cage. But the curved end surfaces 18$b$ according to the invention may be of any other shape, provided the curved end surface 18$b$ is smoothly connected at its ends to the respective side surfaces 18$a$. For example, each curved end surface 18$b$ may comprise a plurality of curved surface portions having different radii of curvature from each other.

Since, as described above, the pair of axially opposed curved end surfaces 18$b$ of each pocket 18 in the row located closer to the closed end of the cage 13, and the curved end surface 18$b$ of each pocket 18 in the row located closer to the open end of the cage 13 are all connected at their respective ends to the respective side surfaces 18$a$, it is possible to prevent stress concentration at the boundaries between the respective curved end surfaces 18$b$ and side surfaces 18$a$ while torque is being transmitted from the input shaft 7 to the output shaft 11. This effectively prevents damage to the cage at these boundaries.

But such curved end surfaces 18$b$ of the pockets 18 tend to allow axial movement of the rollers 19 while torque is being transmitted from the input shaft 7 to the output shaft 11, which causes the chamfers 19$c$ of the rollers 19 to contact the curved end surfaces 18$b$, causing stress concentration at, and thus damage to, the contact portions. Also, the contact between the rollers and the cage hampers smooth rotation/rolling of the rollers 19, increasing torque loss, thus hampering smooth torque transmission.

In order to avoid or reduce these problems, restricting means is provided for restricting the movement of the roller 19 in each pocket 18 toward the curved end surface or surfaces 18$b$.

Figure 9:
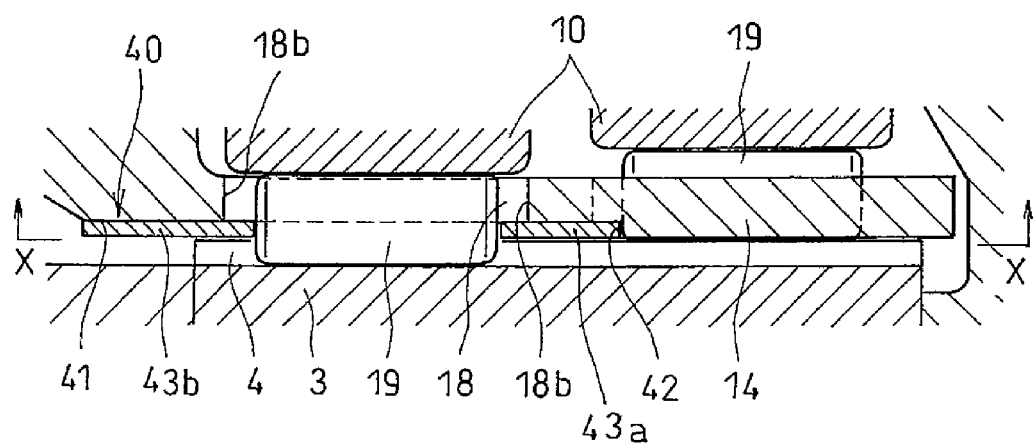
FIG. 9 is a vertical sectional front view of a speed reducer according to a fourth embodiment of the invention.
Figure 10:
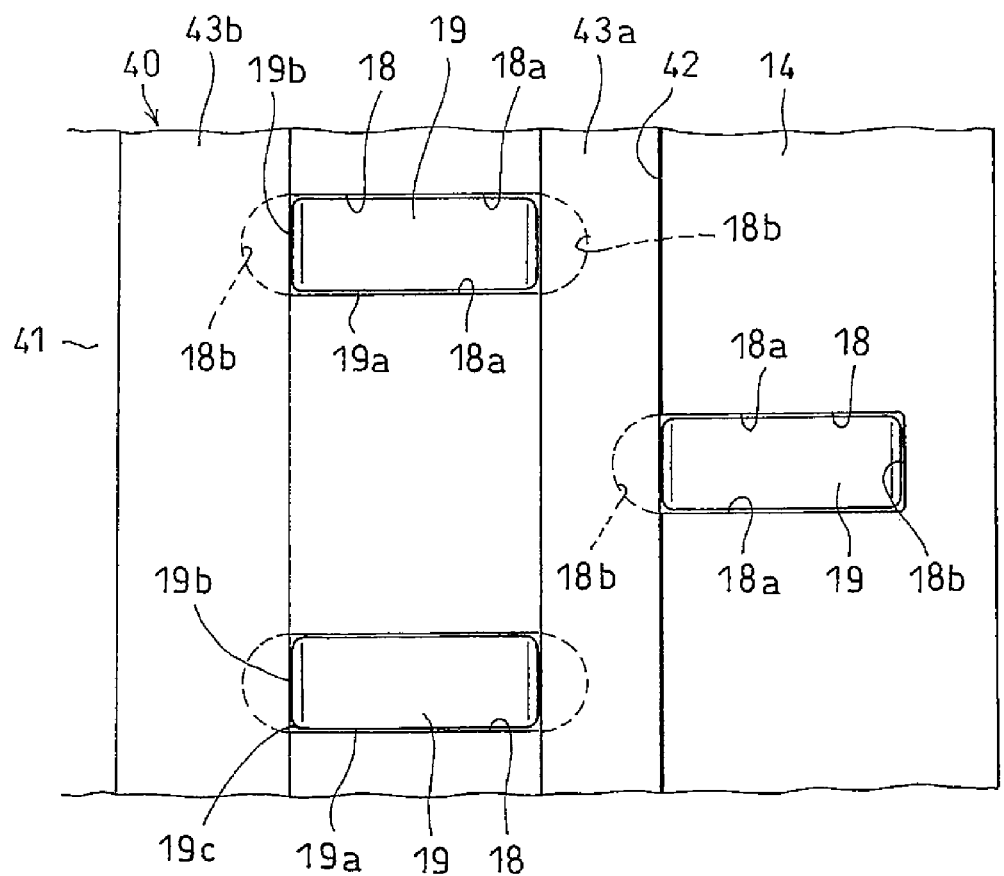
FIG. 10 is a sectional view taken along line X-X of FIG. 9.
Figure 11:
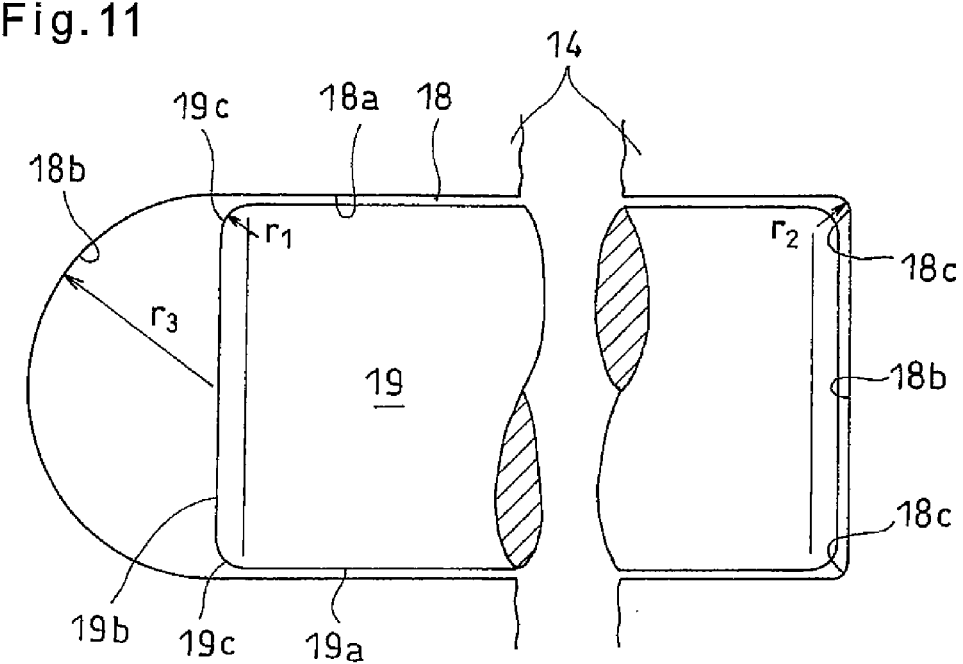
FIG. 11 is an enlarged view of a portion of FIG. 10.
Figure 12:
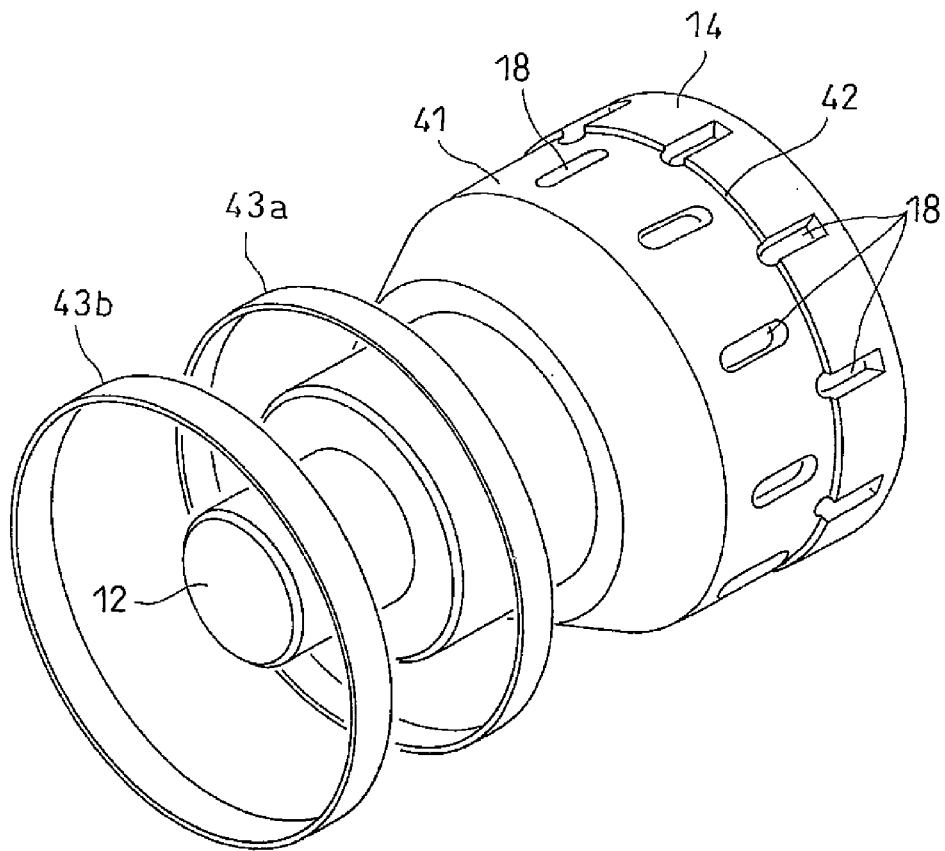
FIG. 12 is an exploded perspective view of an output shaft formed with a cage, and fixing rings.

The restricting means 40 shown in FIGS. 9 and 10 comprises a small-diameter cylindrical surface 41 formed at the closed end of the cage to extend axially and terminate at a shoulder 42 formed at the boundaries between the side surfaces 18$a$ and the curved end surfaces 18$b$, of the respective pockets 18 in the row located closer to the open end of the cage, and two fixing rings 43$a$ and 43$b$ which are press-fitted onto the small-diameter cylindrical surface 41 one after another. In particular, the ring 43$a$ is first press-fitted onto the small-diameter cylindrical surface 41 until its leading end abuts the shoulder 42, and the entire curved end surfaces 18$b$ of the pockets 18 in one and the other rows are covered by the respective end portions of the fixing ring 43$a$. Then, the fixing ring 43$b$ is press-fitted onto the small-diameter cylindrical surface 41 until the curved end surfaces 18$b$ located closer to the closed end of the cage 13, of the pockets 18 in the row located closer to the closed end of the cage 13 are entirely covered by the leading end of the fixing ring 43$b$.

Since the curved end surfaces 18$b$ are entirely covered by the two end portions and the one end portions of the respective fixing rings 43$a$ and 43$b$, the corresponding end surfaces of the fixing rings 43$a$ and 43$b$ axially face the corresponding end surfaces 19$b$ of the rollers 19, thus restricting axial movement of the rollers 19.

The restricting means 40 for restricting axial movement of the rollers 19 is not limited to the one shown in FIGS. 9 to 12. FIGS. 13 to 16 show different restricting means 40. The restricting means 40 shown in FIG. 13 comprises stopper members 44 received in the respective curved end surfaces 18$b$ of the pockets 18.

The stopper members 44 each have an outer peripheral surface comprising an a curved surface 44$a$ complementary in shape to the curved end surfaces 18$b$, and a flat surface 44$b$, and are mounted in position such that their flat surfaces 44$a$ face the respective end surfaces of the rollers 19, thereby restricting axial movement of the rollers 19.

Figure 13:
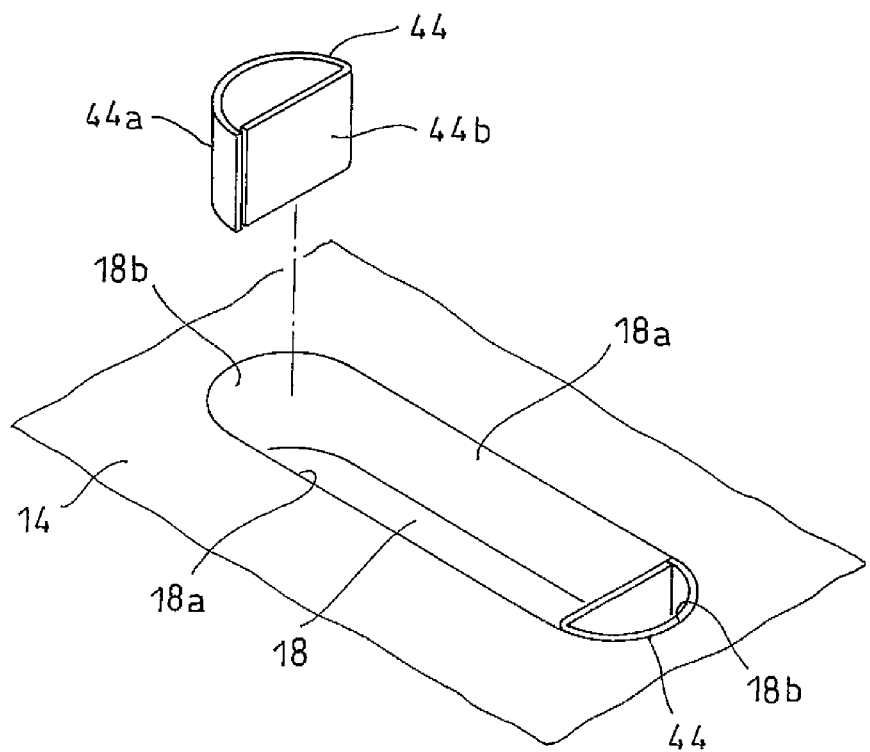
FIG. 13 is an exploded perspective view of a different restricting means for restricting axial movement of rollers.
Figure 14:
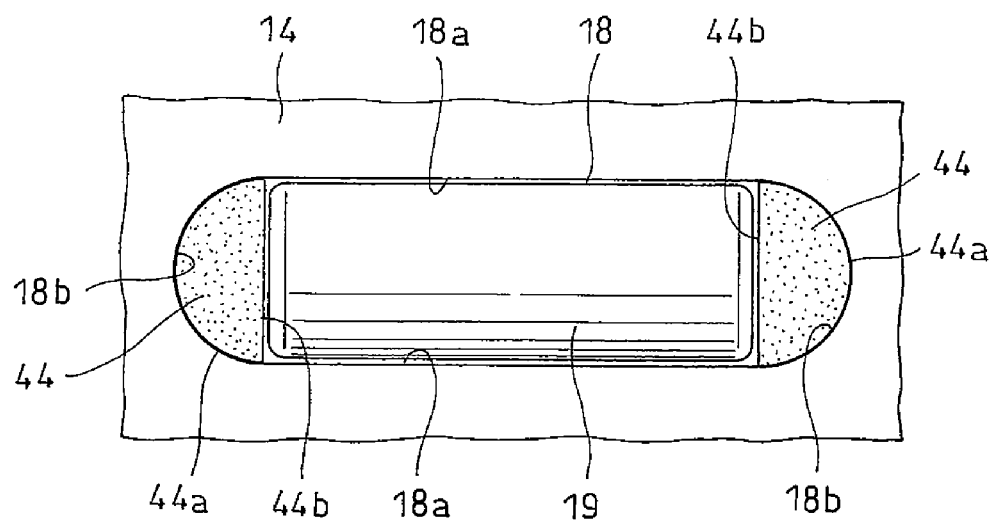
FIG. 14 is a plan view of a still different restricting means for restricting axial movement of the rollers.
Figure 15:
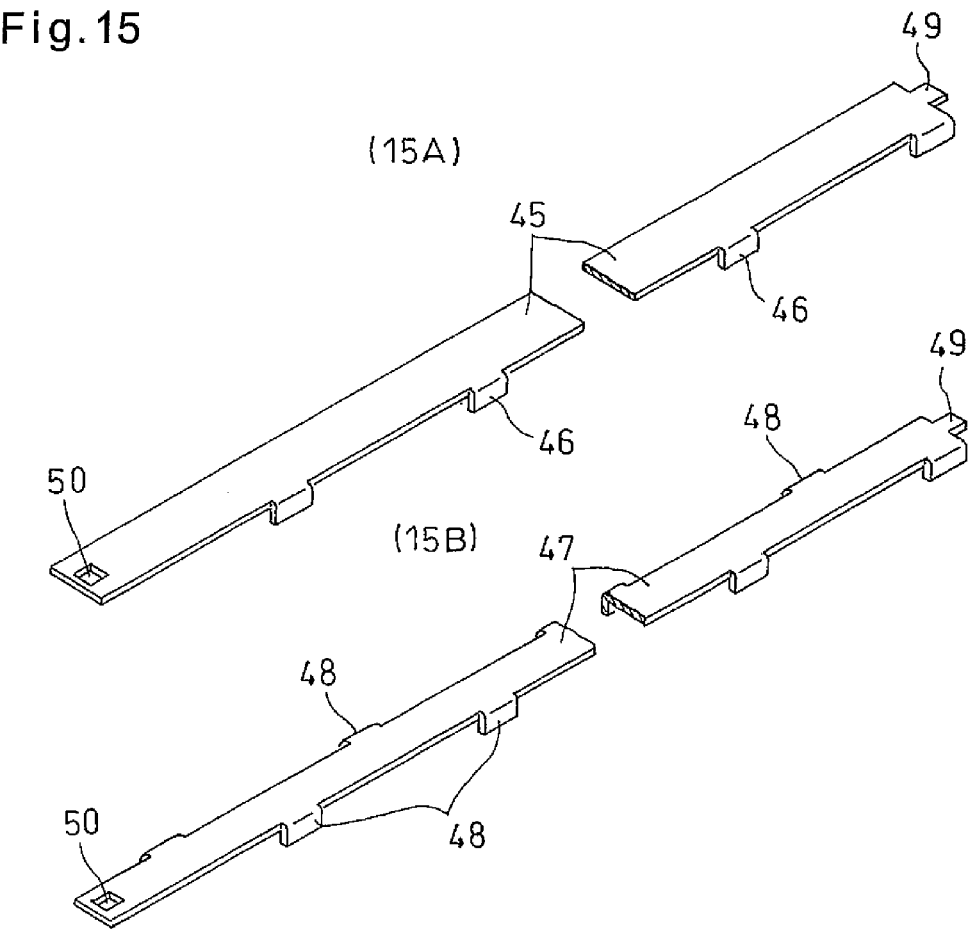
FIGS. 15A and 15B are perspective views of metal strips for restricting axial movement of the rollers.

The stopper members 44 of FIG. 13 are formed by bending metal plates. But the stopper members 44 may be formed from a synthetic resin as shown in FIG. 14, or from rubber. The stopper members 44 have to be inseparably mounted in position in the respective curved end surfaces 18$b$ by press-fitting or by means of adhesive.

Figure 16:
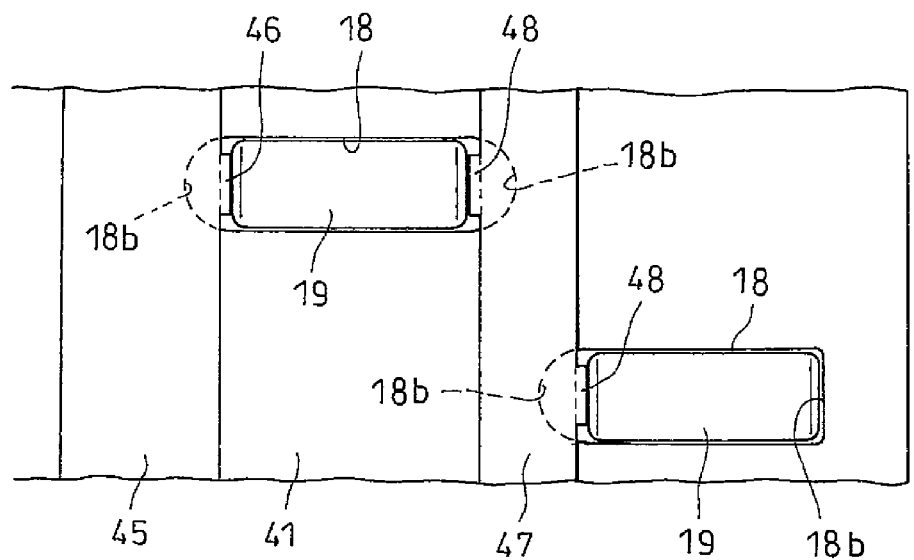
FIG. 16 is a plan view of restricting axial movement of the rollers which comprise the metal strips of FIGS. 15A and 15B.

The restricting means 40 shown in FIGS. 15A, 15B and 16 comprises two metal strips 45 and 47. As shown in FIGS. 15A and 15B, the metal strip 45 includes a plurality of bent pieces 48 on one side thereof, while the metal strip 47 includes a plurality of bent pieces 48 on a first side thereof, and a plurality of bent pieces 48 on a second side thereof which are offset from the respective bent pieces 48 on the first side by half the pitch. The metal strips 45 and 47 are wrapped around the small-diameter cylindrical surface 41 formed on the radially outer surface of the cage 13.

The metal strips 45 and 47, shown in FIGS. 15A and 15B, respectively, are fitted at the same positions as the respective fixing rings 43$b$ and 43$a$ of FIG. 9 are press-fitted in position, with their bent pieces 46 and 48 fitted in the respective end surfaces 19$b$ of the pockets 18. In this state, a protrusion 49 formed at one end of each of the metal strips 45 and 47 is engaged in an engaging hole 50 formed at the other end thereof, thereby keeping the metal strips 45 and 47 wrapped around the cylindrical surface 41. Thus, the bent pieces 46 and 48, which are received in the respective pockets 8, restrict axial movement of the respective rollers 19.

Figure 17:
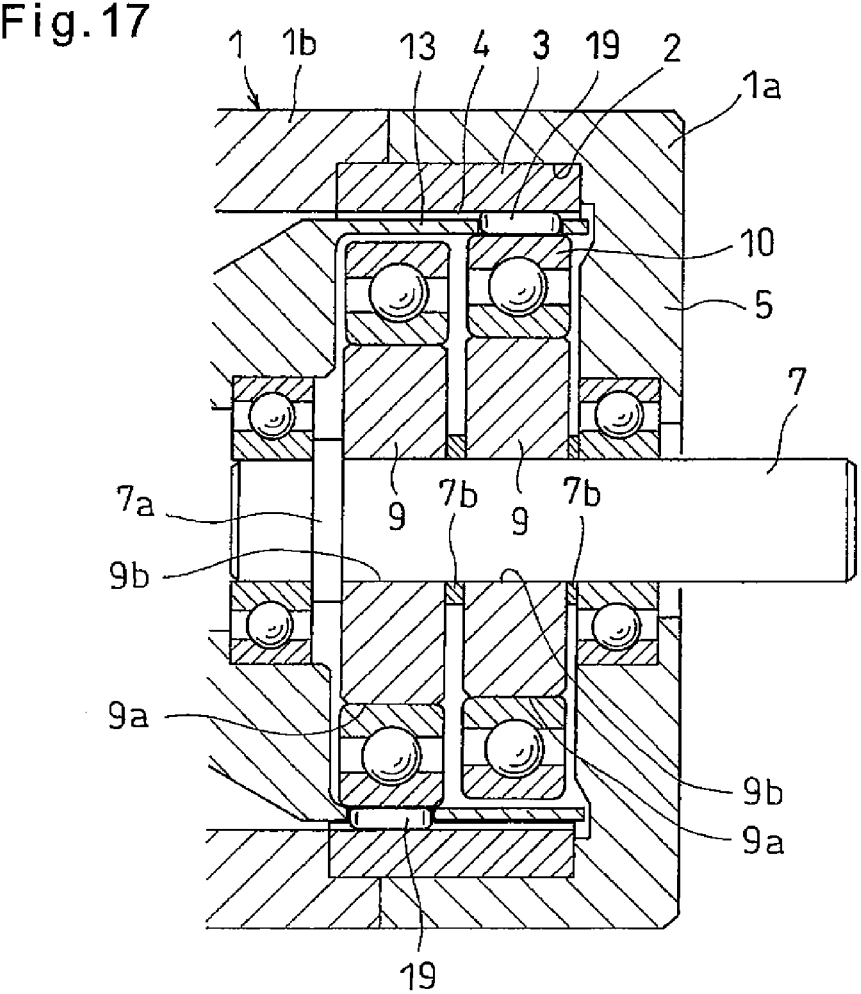
FIG. 17 is a vertical sectional front view of a speed reducer according to a fifth embodiment of the invention.
Figure 18:
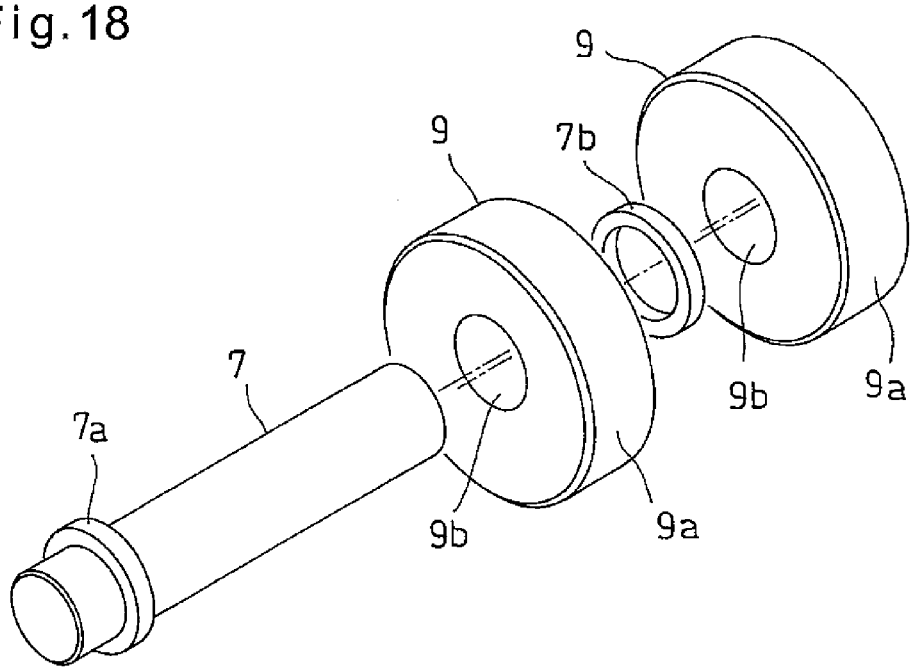
FIG. 18 is an exploded perspective view of an input shaft, eccentric disks and spacers, of the speed reducer of FIG. 17.

In the arrangement of FIG. 1, in which the eccentric disks 9 are integral with the input shaft 7, it is difficult to grind the radially outer surfaces 9a of the eccentric disks 9, on which the respective bearing 10 are fitted. In the fifth embodiment, shown in FIGS. 17 and 18, the eccentric disks 9 are separate members from the input shaft 7, and press-fitted on the input shaft 7 so as to be rotationally fixed relative to the input shaft 7, while being axially positioned by a flange 7a formed at one end of the input shaft 7, and two spacers 7b, one being disposed between the eccentric disks 9 and the other between one of the eccentric disks 9 and the bearing 8, which supports the input shaft 7.

Since the eccentric disks 9 are press-fitted onto the input shaft, each disk has a shaft inserting hole 9b which is offset relative to its radially outer surface 9a.

Here, the eccentric disks 9 are formed first by forming disk members by forging or pressing, and then finishing the radially outer surfaces 10 of the disk members by centerless grinding. But the eccentric disks may be formed by turning instead.

If the eccentric disks 9 are separate members from the input shaft as in the fifth embodiment, the radially outer surfaces of the eccentric disks 9 can be easily finished by e.g. centerless grinding, which leads to reduced manufacturing cost.

Figure 19:
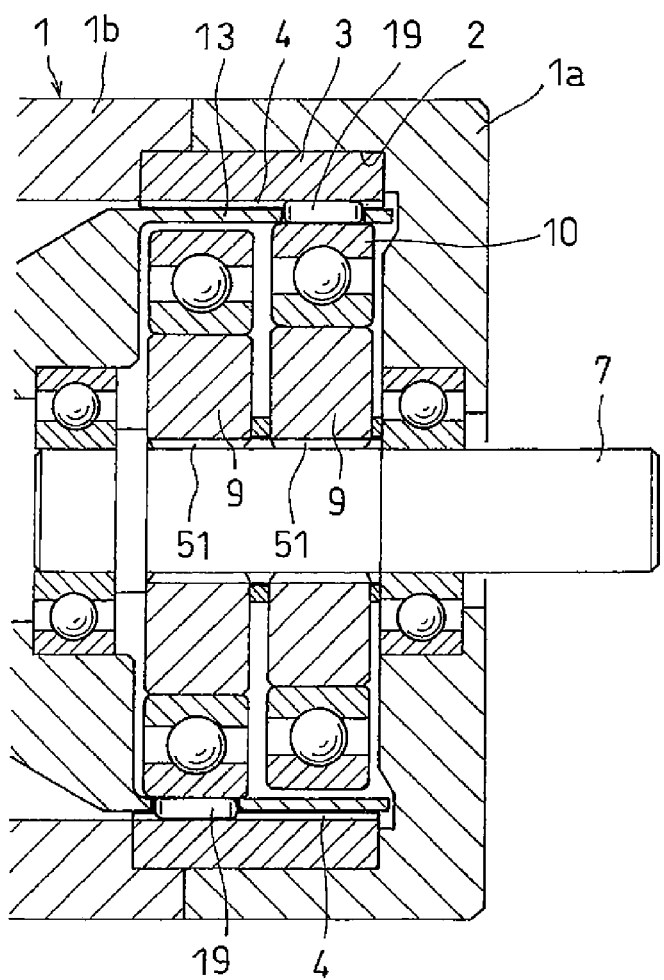
FIG. 19 is a vertical sectional front view of a speed reducer according to a sixth embodiment of the present invention.
Figure 20:
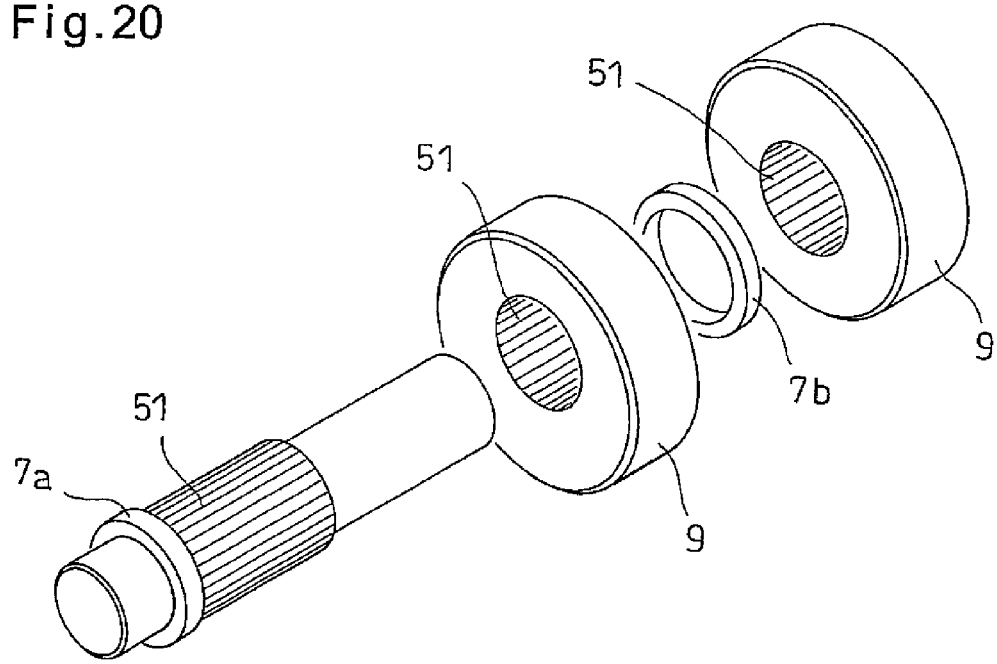
FIG. 20 is an exploded perspective view of an input shaft, eccentric disks and spacers, of the speed reducer of FIG. 19.
Figure 21:
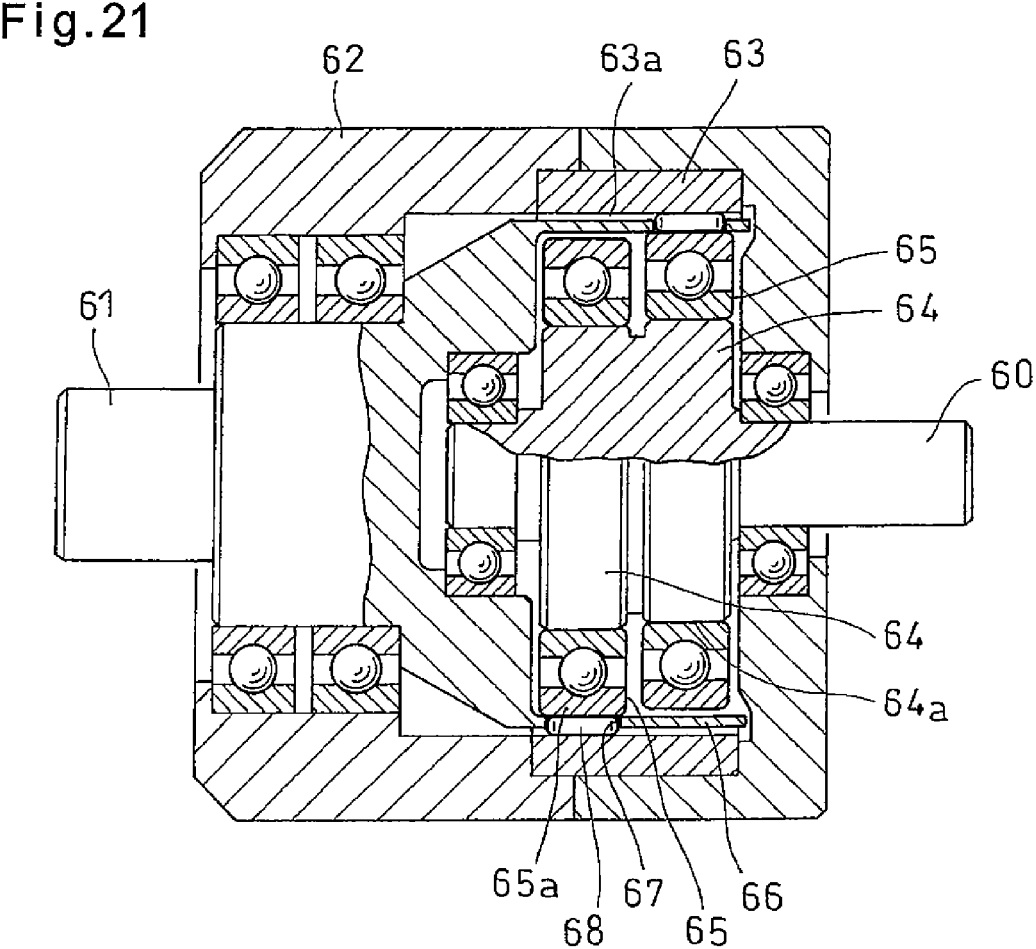
FIG. 21 is a vertical sectional front view of a conventional speed reducer.
Figure 22:
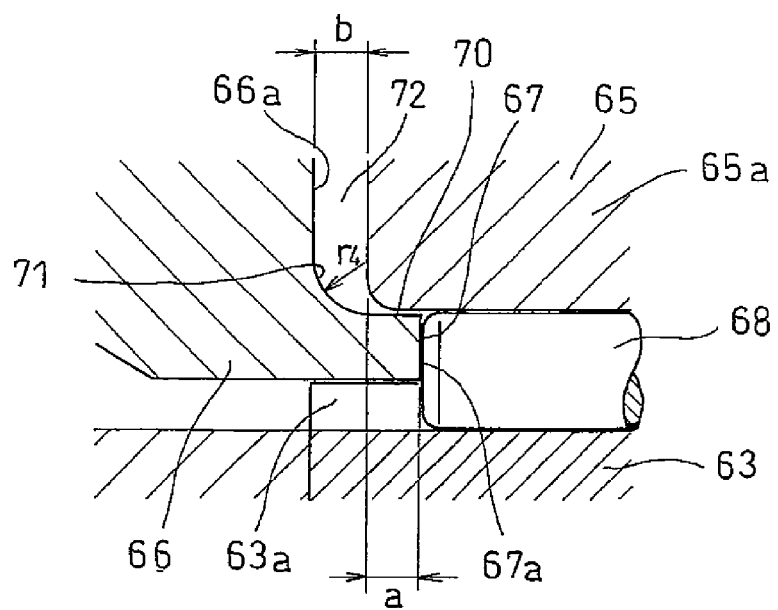
FIG. 22 is an enlarged sectional view of a portion of the speed reducer shown in FIG. 21.

The eccentric disks 9 may be rotationally fixed to the input shaft 7 by means other than press-fitting. For example, as shown in FIGS. 19 and 20, the eccentric disks 9 may be fitted on the input shaft 7 through splines 51. Otherwise, while not shown, the eccentric disks 9 may be rotationally fixed to the input shaft through serrations.

DESCRIPTION OF THE NUMERALS

1. Housing
3. Internal gear
4. Internal tooth
7. Input shaft
9. Eccentric disk
9a. Radially outer surface
9b. Shaft inserting hole
11. Output shaft
13. Cage
14. Closed end surface
18. Pocket
18a. Side surface
18b. End surface
19. Roller
19b. End surface
19c. Arcuate chamfer
20. Radially inner surface
21. Recess
23. Spline
26. Elastic member
35. Bolt
36. Bolt inserting hole
37. Threaded hole
38. Elastic member
40. Restricting means
41. Small-diameter cylindrical surface
42. Shoulder
43a, 43b. Fixing ring
44. Stopper member
45, 47. Metal strip
46, 48. Bent pieces
51. Spline

What is claimed is:

1. A speed reducer comprising a stationary housing, an internal gear supported by the housing and having a plurality of internal teeth on an inner periphery of the internal gear, an input shaft including an eccentric disk provided at one end portion of the input shaft and rotatable in the internal gear, an output shaft coaxial with the input shaft, a cage provided at an end portion of the output shaft facing the input shaft and rotatably disposed between the internal gear and the eccentric disk, said cage being formed with circumferentially equidistantly spaced apart pockets which are not equal in number to the internal teeth of the internal gear at a portion of the cage that is radially aligned with the eccentric disk, rollers received in the respective pockets and configured to mesh with the respective rollers one after another when the eccentric disk rotates such that when the input shaft rotates once, each roller moves in a circumferential direction by a distance equal to a circumferential dimension of one of the internal teeth, whereby the output shaft is rotated at a reduced speed, characterized in that the cage is formed with an annular recess at a corner between a radially inner surface of the cage and a closed end surface of the cage.

2. The speed reducer of claim 1, wherein the annular recess is formed by forging.

3. The speed reducer of claim 1, wherein the internal gear is supported on a radially inner surface of the housing so as to be alignable.

4. The speed reducer of claim 3, wherein means for supporting the internal gear so as to be alignable comprises spline engagement with which the internal gear is fitted in the radially inner surface of the housing, and an elastic member provided between engaging surfaces of the spline engagement.

5. The speed reducer of claim 3, wherein means for supporting the internal gear so as to be alignable comprises a plurality of bolt inserting holes extending through the internal gear from one to another end surfaces of the internal gear, bolts inserted through the respective bolt inserting holes and threaded into respective threaded holes formed in an end surface of the housing, thereby supporting the internal gear, and elastic members disposed between the respective bolts and bolt inserting holes.

6. The speed reducer of claim 1, wherein the internal teeth have a surface roughness of Ra 1.6 or less.

7. The speed reducer of claim 1, wherein each pocket has a first end surface and a second end surface opposite to the first end surface in an axial direction of the cage and located closer to the closed end surface of the cage, wherein at least the second end surface is a curved end surface having a radius of curvature larger than a radius of curvature of arcuate chamfers formed at the corners between a rolling surface and respective end surfaces, of each roller, the curved end surface being smoothly connected to side surfaces of the pocket which are opposed to each other in a circumferential direction of the cage, and wherein the speed reducer further comprises restricting means for restricting movement of the rollers toward the curved end surfaces of the respective pockets.

8. The speed reducer of claim 7, wherein the curved end surfaces of each pocket is a semicircular surface having a diameter equal to a width of the pocket in the circumferential direction of the cage.

9. The speed reducer of claim 7, wherein the restricting means comprises a small-diameter cylindrical surface on a radially outer surface of the cage near the closed end surface of the cage, and a fixing ring press-fitted on the small-diameter cylindrical surface and having a leading end with respect to the direction in which the fixing ring is press-fitted onto the small-diameter cylindrical surface, the leading end being configured to restrict movement of the rollers toward the respective curved end surfaces.

10. The speed reducer of claim 9, wherein the small-diameter cylindrical surface extends axially and terminates at a shoulder which is located at boundaries between side surfaces that are opposed to each other in the circumferential direction of the cage and the curved end surface, of each of the pockets.

11. The speed reducer of claim 7, wherein restricting means comprises stopper members received in the curved end surfaces of the respective pockets and configured to restrict movement of the rollers toward the respective curved end surfaces.

12. The speed reducer of claim 11, wherein each of the stopper members is one of a bent metal strip, an article made of a synthetic resin, and an article made of rubber.

13. The speed reducer of claim 7, wherein the restricting means comprises a small-diameter cylindrical surface on a radially outer surface of the cage near the closed end surface of the cage, and a metal strip wrapped around the small-diameter cylindrical surface and including bent pieces formed on one side surface of the metal strip and inserted in the respective pockets, the bent pieces being configured to restrict movement of the rollers toward the respective curved end surfaces.

14. The speed reducer of claim 1, wherein the eccentric disk has a hole through which the input shaft is inserted and whose center is offset from the center of the radially outer surface of the eccentric disk, which is cylindrical in shape, and wherein the eccentric disk is a separate member from the input shaft and fitted on the input shaft while being rotationally fixed to the input shaft.

15. The speed reducer of claim 14, wherein the eccentric disk is rotationally fixed to the input shaft by press-fitting the eccentric disk on the input shaft.

16. The speed reducer of claim 14, wherein the eccentric disk is rotationally fixed to the input shaft by fitting the eccentric disk on the input shaft through splines or serrations.

17. The speed reducer of claim 14, wherein the eccentric disk is formed by forming an eccentric disk material by forging or pressing, and finishing a radially outer surface of the eccentric disk material by grinding.

* * * * *